United States Patent [19]

Hayashi

[11] 4,330,281

[45] May 18, 1982

[54] HOLDER FOR A DENTAL HANDPIECE

[75] Inventor: Kazuo Hayashi, Yahata, Japan

[73] Assignee: Kabushiki Kaisha Morita Seisakusho, Kyoto, Japan

[21] Appl. No.: 254,050

[22] Filed: Apr. 14, 1981

[30] Foreign Application Priority Data

Apr. 14, 1980 [JP] Japan ............................ 55/51626[U]

[51] Int. Cl.³ ................................................ A61C 1/08

[52] U.S. Cl. ....................................... 433/108; 433/33; 433/79; 433/109; 248/51

[58] Field of Search .................... 433/108, 109, 77, 79, 433/33; 248/51, 52, 62, 60

[56] References Cited

U.S. PATENT DOCUMENTS

| | | | |
|---|---|---|---|
| 278,464 | 5/1883 | Starr | 433/108 |
| 2,332,374 | 10/1943 | Fagan | 248/52 |
| 3,078,575 | 2/1963 | Fontana | 433/79 |
| 3,083,462 | 4/1963 | Jermyn | 433/109 |
| 3,386,766 | 6/1968 | Gorelick | 433/33 |
| 3,530,513 | 9/1970 | Maurer et al. | 433/77 |
| 3,823,475 | 7/1974 | Heubeck | 433/33 |

FOREIGN PATENT DOCUMENTS

| | | | |
|---|---|---|---|
| 1065129 | 9/1959 | Fed. Rep. of Germany | 433/77 |
| 2417955 | 10/1974 | Fed. Rep. of Germany | 433/77 |
| 2545638 | 4/1977 | Fed. Rep. of Germany | 433/77 |

*Primary Examiner*—Gene Mancene

*Assistant Examiner*—John J. Wilson

*Attorney, Agent, or Firm*—Koda and Androlia

[57] ABSTRACT

An improved dental handpiece holder supports a handpiece in the region from the rear end of the grip portion to the tail-stock portion. A front gripping holder portion prevents movement in the horizontal direction, a rear gripping holder portion prevents a forward tipping moving, and the front and rear gripping portions co-act to prevent movement of the handpiece in the axial direction. The front gripping portion is provided with three separate portions, one on the left hand wall and two on its right hand wall. The two supporting portions on the right hand wall are spaced axially apart from one another, and the single supporting portion on the left hand wall is located in a axial position intermediate that of the opposing two portions. Right and left supporting portions in the rear gripping portion support the tail-stock of the handpiece. A brim extending from the upper wall of the right hand rear supporting portion extends tangentially upward and to the left and facilitates the proper removal and replacement of the handpiece. The holder may be supported with respect to the backrest of a treatment chair holding a supine patient such that a dental surgeon seated in front thereof can conveniently remove and replace the handpiece held by such a holder in a conventional pen-grip manner. A second receptacle may be added to the holder for holding a second handpiece in a similar manner.

3 Claims, 9 Drawing Figures

HOLDER FOR A DENTAL HANDPIECE

BACKGROUND OF THE INVENTION

1. Field of the Invention

This invention relates generally to holders for dental handpieces such as air-turbine handpieces or micro-motor handpieces when not in use and more particularly to handpiece holders intended for the convenient removal and replacement of the handpiece during the course of dental treatment by a dental surgeon.

2. Description of the Prior Art

Japanese Utility Model Publication No. 46877 of 1976 describes a type of dental handpiece holder suspended from the ceiling by means of a metal fitting and positioned so as to be conveniently accessable to a seated dental surgeon, who was merely by raising his forearm, easily able to grip the handpiece held by the holder.

However, most prior art dental handpiece holders have a trough-like structure having a simple semi-circular cross section with which was associated certain shortcomings. In particular, there is a tendancy for a handpiece held by such a holder to inch forward as a result of external vibration and/or of contact between the flexible hose connected to the handpiece and the knee of the dentist. In either event, the handpiece is free to slide easily within the trough-like holder and easily slips out, whereupon it must be replaced back in the holder with resultant inconvenience. With such prior art handpiece holders, this happens quite frequently.

In order to overcome this shortcoming, it has been proposed to provide the inner surface of the holder with a plurality of projections made from rubber (or other elastic materials) so as to enlarge the area of contact with the handpiece and to increase the friction between the handpiece and the holder. However, the use of such rubber-like projections also had attendant disadvantages such as trapping dirt and debris between the projections which could not be conveniently cleaned out.

SUMMARY OF THE INVENTION

Accordingly, it is a main object of the invention to provide a dental handpiece holder which holds the handpiece reliably, which permits the handpiece to be readily removed and replaced, and which can be conveniently cleaned and maintained in a hygenic condition.

In general, the dental handpiece, whether the high speed air-turbine type or the low speed micro-motor type, is roughly of cylindrical shape. Commencing at its rear-end and proceeding forwardly in the axial direction. Such a handpiece will typically have a larger diameter tail-stock portion, a medium diameter grip portion, and a work rod of gradually decreasing diameter, with a tool holder at its head end.

In accordance with the present invention, a holder for such a handpiece holds the handpiece at the region of the grip portion adjacent to the tail-stock portion and at the tail-stock portion itself and differs from the conventional type of receptacle which holds the handpiece by means of a simple semi-circular body by being provided with a plurality of supporting surfaces for accomplishing the following functions.

The front gripping portion of the holder secures the handpiece against undesired horizontal movements, the rear gripping portion secures the handpiece against any undesired forward tilting movements, and both of said gripping portions co-act to prevent any undesired shifting movements of the handpiece along its axis. More specifically, the front gripping portion is provided with three supporting portions, namely a first supporting portion located in the left hand sidewall and two additional supporting portions axially spaced from one another on the right hand sidewall. These three supporting portions co-act with one another to prevent the handpiece from shifting and twisting in the horizontal plane by holding the grip portion of the handpiece just forward of the tail-stock. The rear gripping portion of the holder is provided with supporting portions which loosely support the handpiece in the axial direction and which cooperate with the front gripping portion to prevent undesired axial shifting of the handpiece. The rear grip portion also includes a brim extending from the upper end of the right hand sidewall for preventing the handpiece from tipping forward.

The salient structural features of the invention will now be described in detail with reference to the following enumerated drawings of a preferred embodiment.

DETAILED DESCRIPTION OF A PREFERRED EMBODIMENT

Figure 1:
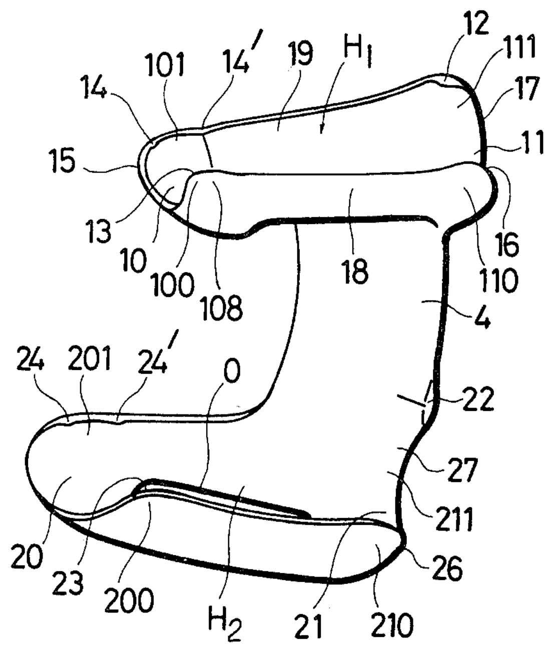
FIG. 1 is a side view of a preferred embodiment of a holder for a dental handpiece in accordance with the present invention.
Figure 2:
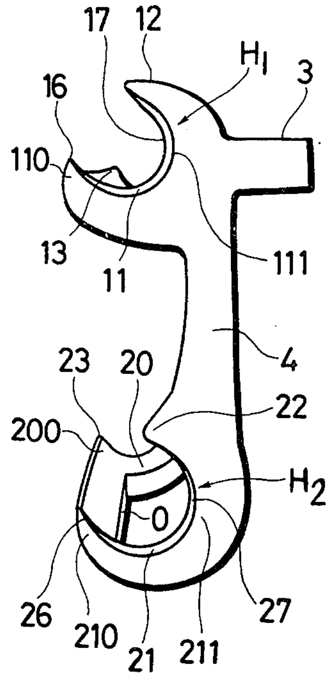
FIG. 2 is a top view of the holder of FIG. 1.
Figure 3:
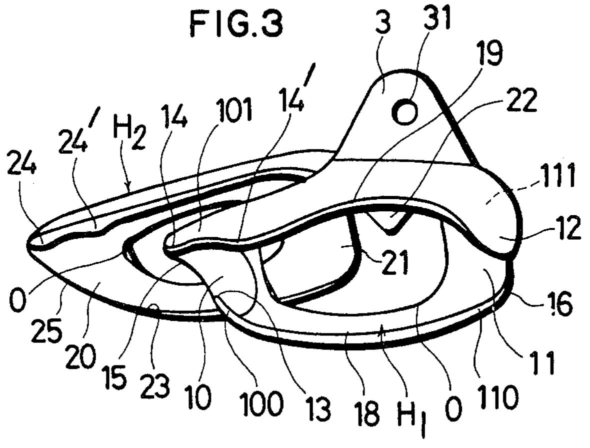
FIG. 3 is a rear view of the holder of FIG. 1.
Figure 4:
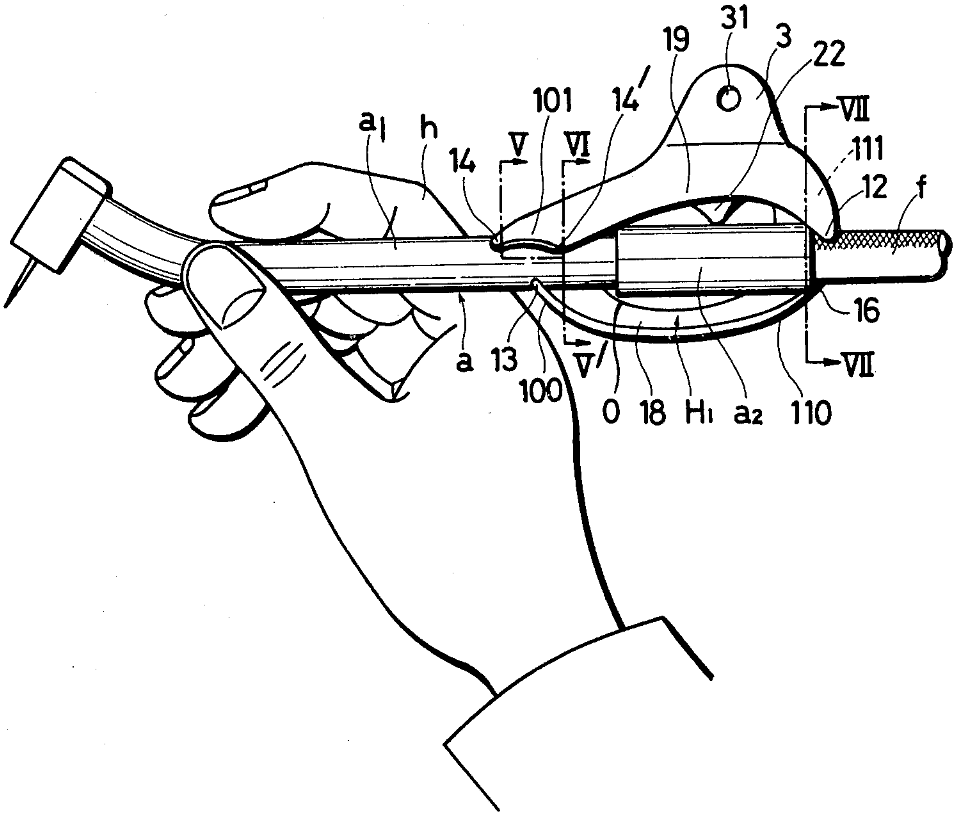
FIG. 4 is a fragmentary top view showing the relative relationship between the upper holding receptacle of FIG. 1 and a handpiece held thereby.
Figure 5:
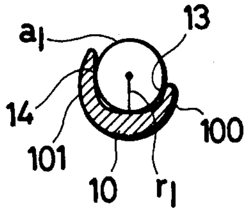
FIG. 5 is a vertical section along the line V—V of FIG. 4.
Figure 6:
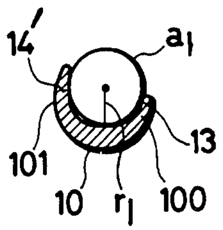
FIG. 6 is a vertical section along the line of VI—VI of FIG. 4.

The preferred embodiment illustrated in the drawings is in the form of a duplex holder with two receptacles, one above the other and connected by means of a vertical trunk. However, it should be understood that various modifications and substitutions, for example a holder having but a single receptacle or having three receptacles, can be made to the illustrated preferred embodiment without departing from the spirit of the invention.

A handpiece a is gripped by the holder H of the present invention in the region between the rear-end of its grip portion $a_1$ and its larger diameter tail-stock portion $a_2$ and is thereby maintained in a generally horizontal or somewhat obliquely inclined orientation. The holder H comprises a front gripping portion 10 and a rear gripping portion 11. The front gripping portion 10 includes a first supporting portion 13 provided in left-hand sidewall 100 and two axially spaced additional supporting portions 14, 14' provided on a right-hand sidewall 101. The front gripping portion 10 also includes an inclined edge 15 which is almost parallel to the index finger h of the dental surgeon when he grips the handpiece in the conventional manner (as one would grip a pen). The height of the sidewalls 100, 101 is approximately equal to the radius r, of handpiece grip portion a.

Rear gripping portion 11 also has a left-hand sidewall 110 provided with a first supporting portion 16 and with a right-hand sidewall 111 provided with a second supporting portion 17; brim 12 extends tangentially from the upper edge of the right-hand side sidewall 111. The height of left-hand sidewall 110 is approximately equal to the radius $r_2$ of the tail-stock portion $a_2$ and the height of the right-hand sidewall 111 is greater than radius $r_2$.

As noted above, the embodiment illustrated in the drawings also has a second receptacle $H_2$ comprising a front gripping portion 20 and a rear gripping portion 21 holding a second handpiece b. As illustrated, upper handpiece a is of the air-turbine type and lower handpiece b is of the micro-motor type. This second receptacle $H_2$ is provided at the lower end of vertical trunk 4; lower front gripping portion 20 corresponds to upper front gripping portion 10, while lower rear gripping portion 21 corresponds with upper rear gripping portion 11. The upper receptacle has been designated $H_1$ in the drawings; the lower receptacle has been designated as $H_2$. Receptacles $H_1$, $H_2$ and trunk 4 may be intrically formed from plastic, metal, or other appropriate material.

Upper receptacle $H_1$ is oriented more or less horizontally to facilitate the convenient gripping of handpiece $a_1$ as aforesaid; lower receptacle $H_2$ is oriented so as to tip slightly in the rearwards direction as explained in more detail hereinafter. Lower receptacle $H_2$ is located somewhat to the front of receptacle $H_1$; accordingly the location at which the upper handpiece a is gripped is not directly vertically above the location for gripping of the lower handpiece b.

Front gripping portion 10 and rear gripping portion 11 of upper receptacle $H_1$ are connected to one another by means of intermediate walls 18, 19; a hole 0 is formed at the bottom of the receptacle. The purpose of this hole is to decrease the area of contact between the receptacle and the handpiece, to facilitate the removal and replacement of the handpiece from the holder H, to decrease the area in which dust may accumulate and thereby improve the hygenic qualities of the device, and to effect economies in weight and material.

In order to further facilitate the convenient removal and replacement of the handpiece, the intermediate walls 18, 19 are curved outwards at a larger radius than that of tail-stock $A_2$, thereby further decreasing the area of contact between the handpiece and holder. The spaced apart supporting portions, 14, 14' of front gripping portion right sidewall 101 have an area of contact that is relatively great to thereby prevent the handpiece from slipping off to the right; by way of comparison, the supporting portion 13 of front gripping portion left-hand sidewall 100 is in the form of a projection having a relatively small tip in order to facilitate the removal of the handpiece to the left. Each of the supporting portions 13, 14, 14' provided in front gripping portion 10 corresponds to one of the vertices of an isosceles triangle, with axis of the handpiece grip portion $a_1$ in the middle of the triangle parallel to its base.

Figure 7:
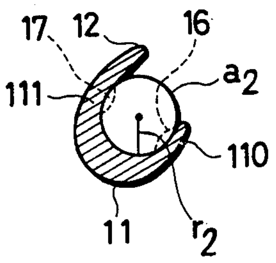
FIG. 7 is a vertical section along the line of VII—VII of FIG. 4.

Additionally, brim portion 12 provided as part of rear gripping portion 11 is formed more or less in the shape of a triangle and extends tangentially against the circumference of tail-stock portion $a_2$; as shown in FIG. 7 brim portion 12 extends from the upper edge of rear gripping portion right-hand sidewall 111 and its inner surface is radiused outwardly so as to avoid contact with the periphery of grip $a_1$. By providing brim 12 with a radiused inner surface and with a triangular shape, the proper removal of the handpiece (i.e., in the left-hand direction with respect to the holder) is thereby facilitated.

Similarly, the front gripping portion 20 and the rear gripping portion 21 of lower receptacle $H_2$ is constructed as has been described above with respect to upper receptacle $H_1$, except that lower brim 22 of the lower receptacle projects from trunk 4 connecting the two receptacles.

The method of use and the attendant advantages of a dental handpiece holder in accordance with the present invention will now be described.

Figure 8:
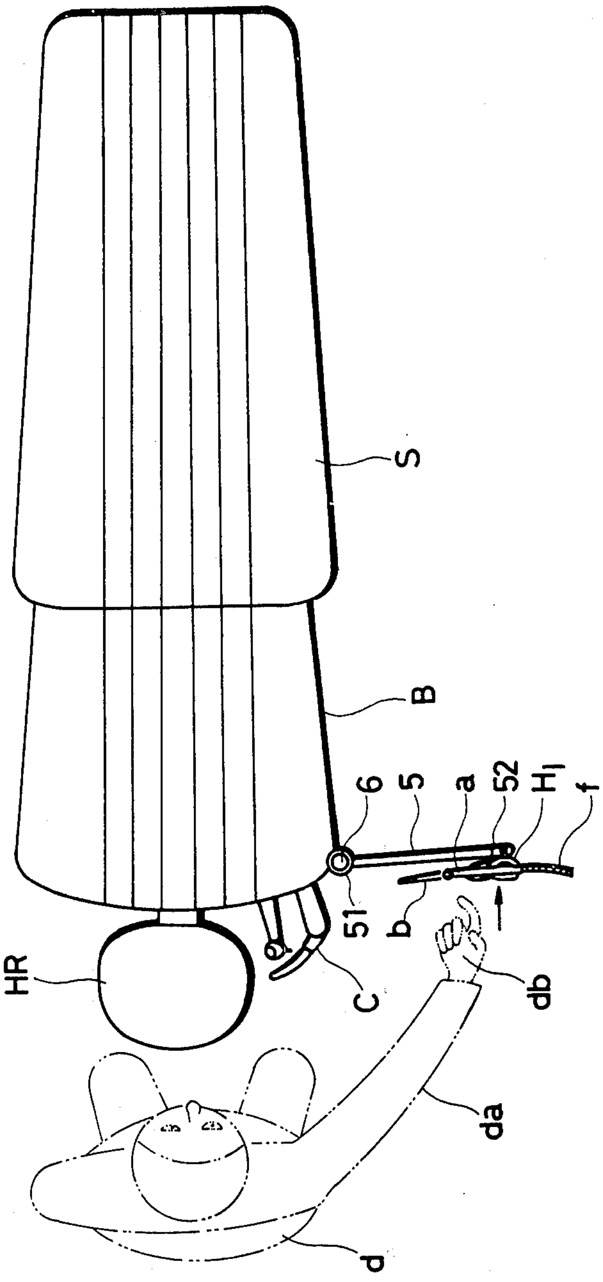
FIG. 8 is a top view showing the relative positions of a dental chair and of the holder of FIG. 1 when the latter is in use.
Figure 9:
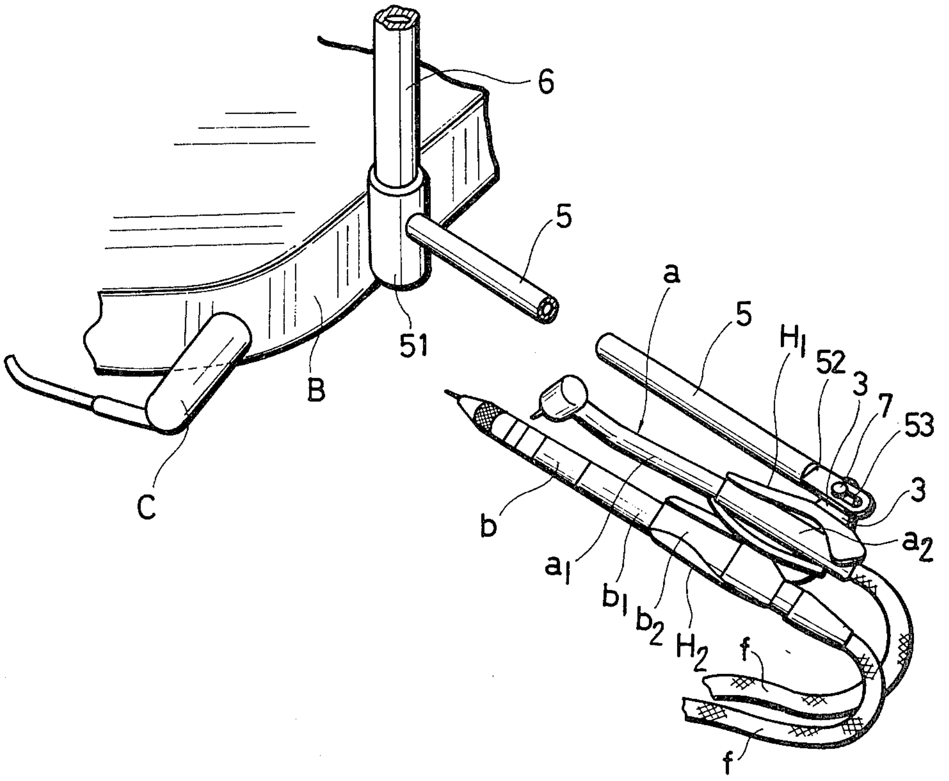
FIG. 9 is an enlarged fragmentary, partially-exploded view of the holder in use.

By way of example, as is shown in FIGS. 8 and 9, a horizontal arm 5 may be supported by means of a sleeve 51 which is free to pivot about a post 6 located at the front right corner of backrest B. Receptacles $H_1$ and $H_2$ may be attached to horizontal arm 5 by means of an appropriate bracket which is pressed against a flat portion 52 of arm 5 by means of a screw 7 passing through bracket hole 31 and flattened portion slot 53.

Once the holder H and its two receptacles $H_1$, $H_2$ have been thereby fixed in place, the two handpieces, a, b may be placed into their respective receptacles $H_1$, $H_2$, handpiece a being held aproximately horizontally and handpiece b being held so as to tip down at its rear.

As is shown in FIG. 8, when a dental surgeon is seated just in front of headrest HR and is engaged in a treatment activity wherein the patient (not shown) is in a horizontal or supine position, the two receptacles $H_1$ and $H_2$ of the handpiece holder are so positioned in space with respect to the surgeon that he can readily and conveniently reach out and remove and replace either of the two handpieces a, b with his right arm da and right hand db, gripping the handpieces in the aforedescribed conventional pen-grip manner.

In FIGS. 8 and 9, reference character C indicates a conventional 3-way syringe projecting from the shoulder portion of the backrest B, and reference character S indicates the seat associated with the backrest B.

The structure of a handpiece holder in accordance with the present invention having thus being described in considerable detail, including its dimensional relationships with the dental handpiece as well as its intended physical location in space with respect to the seated dental surgeon, the resultant effects and advantages attendant upon its intended manner of use will now be explained. This explanation makes particular reference to upper handpiece a and upper receptacle $H_1$; however, it is equally applicable to lower receptacle $H_2$ and lower handpiece b.

The rear end of grip portion $a_1$ of dental handpiece a is supported from below by front gripping portion 10; the handpiece tail-stock portion $a_2$ is supported by rear gripping portion 11. Grip $a_1$ is held at its periphery by a total of three supporting portions provided as part of front gripping portion 10—two supporting portions 14, 14' in the right hand sidewall and one supporting portion 13 in the left hand sidewall. Front gripping portion 10 thereby eliminates practically all shifting and twisting movements of the handpiece in the horizontal plane. It should be noted that if only two such supporting portions were to be provided, one on the left sidewall and one on the right sidewall, then if one supporting portion were to experience wear, then the front gripping portion would no longer be able to prevent a considerable amount of shifting and twisting of grip $a_1$ horizontally; however, by providing a total of three such supporting portions in accordance with the present invention, with portion 13 between portions 14 and 14', front gripping portion 10 is able to prevent excessive horizontal shifting and twisting movements even if one of the supporting portions is worn.

Furthermore, since the supporting portions 16, 17 of rear gripping portion 11 are located to the rear of the handpiece's tail-stock portion $a_2$, and forward supporting portions 14 are located to the front of the tail-stock and have an inner diameter smaller than that of the tail-stock, the tail-stock is thereby prevented from excessive movement in the axial direction.

Additionally, the construction of brim 12 associated with rear gripping portion 11 prevents the tail-stock from assuming a downwardly inclined position, even if the flexible hose f extending from the handpiece is knocked by the surgeon.

Turning now to the manner in which the handpiece may be conveniently removed from and replaced into the receptacle, since the maximum height of left hand sidewalls 110, 111 respectively associated with front gripping portion 10 and rear gripping portion 11 is respectively approximately equal to the radius r, of grip portion $a_1$ and to the radius $r_2$ of tail-stock portion $a_2$, and since brim portion 12 of rear gripping portion 11 extends from the upper edge of right hand sidewall 111 of rear gripping portion 11 (which it will be recalled has a dimension greater than that of radius $r_2$ of tail-stock portion $a_2$) so as to extend tangentially to stock $a_2$ and slants upwardly and to the right so as to facilitate the removal and replacement of the handpiece from the left hand side of the holder, with the direction of removal being upwardly and to the left (towards the surgeon d as shown in FIG. 8) and with the replacement direction being downwardly and to the right (away from the surgeon as shown in FIG. 8).

Since inclined edge 15 of front grip portion 10 is designed so as to be essentially parallel to the index finger h when the handpiece is gripped in the conventional pen-grip manner, the surgeon's index finger does not come into direct contact with the receptacle $H_1$ at any time, and thereby the dental surgeon is encouraged to maintain a natural pen-grip when removing and replacing the handpiece.

Finally, it should be particularly noted that when the handpiece a is being replaced in receptacle $H_1$, the present invention has the remarkable result that it is quite unnecessary that the surgeon's fingers attempt to orient the handpiece with respect to the receptacle such that it contacts both the front gripping portion 10 and the rear gripping portion 11 simultaneously; rather, it is merely necessary for him to put the tail-stock portion $a_2$ into the rear gripping portion 11 through the opening defined by brim 12 and rear gripping portion left sidewall 110. When he lets go his grip, the front end of the handpiece falls into place into front gripping portion 10 by its own weight, whereupon it is firmly held in place.

Furthermore, since there are no folds or projections and the like provided on the inner surfaces of the receptacle $H_1$, $H_2$, according to the invention only a front gripping portion 10 and rear gripping portion 11 need be provided, dirt and debris does not accumulate inside and is accordingly very easy to keep the holder clean and sanitary.

As noted above, similar results are also obtained in the case of lower receptacle $H_2$ and the above description thereof is equally applicable to the lower receptacle $H_2$, with the substitution of the reference numerals and characters associated with the lower receptacle being substituted for the corresponding reference numerals and characters associated with the upper receptacle.

Although the present invention has been described in detail with particular reference to a presently preferred embodiment thereof, as noted previously other embodiments of the invention will be apparent to the skilled artisan without departing from the scope and spirit of the invention.

Additionally, it should be noted that the above description and the appended claims make particular reference to a holder adapted for use by a right handed dental surgeon. Obviously, by merely switching left to right and vice-versa an essentially identical holder could be provided for left handed dental surgeons, and the present invention is also intended to encompass such left handed embodiments.

What is claimed is:

1. A holder for holding a dental handpiece having a grip portion of a first diameter and a tail-stock portion of a larger diameter in a generally horizontal or inclined posture comprising:

a trough shaped front gripping portion having a left front sidewall provided with a single supporting portion, a right front sidewall provided with a pair of axially spaced supporting portions, and an inclined lower front edge extending from the vicinity of said left front sidewall supporting portion to the forward one of said pair of supporting portions, the axial position of said left front sidewall supporting portion being intermediate the corresponding axial locations of said pair of supporting portions, the height of said right and left front sidewalls having a dimension approximately equal to that of the radius of said handpiece grip portion; and a trough shaped rear gripping portion having left and right rear sidewalls each provided with a single supporting portion, and a brim extending tangentially from the upper edge of said rear sidewall, the height of said left rear sidewall having a dimension approximately equal to that of the radius of said handpiece tail-stock portion and said right rear sidewall having a height dimension greater than that of the radius of said handpiece tailstock portion.

2. A holder according to claim 1 further comprising a second front gripping portion and a second rear gripping portion adapted to hold a second handpiece, and a vertical trunk portion for connecting said second front and rear gripping portions to the remainder of said holder, so that the two handpieces may be held by said holder one above the other.

3. A dental handpiece holder according to claim 1 or 2 further comprising means for mounting said holder in a position adjacent the top right corner of the backrest of a dental chair such that a dental surgeon seated in front of said backrest engaged in performing a treatment operation on a supine patient can reach and grip a dental handpiece held by said holder in a pen-grip manner.

* * * * *